United States Patent Office.

FRANÇOIS PETITDIDIER, OF PARIS, FRANCE.

Letters Patent No. 64,562, dated May 7, 1867.

---

APPLYING DESIGNS IN RELIEF AND BRILLIANCY TO WOVEN FABRICS.

---

The Schedule referred to in these Letters Patent and making part of the same.

---

TO ALL WHOM IT MAY CONCERN:

Be it known that I, FRANÇOIS PETITDIDIER, of Paris, in the Empire of France, have invented a new or improved Method of Printing or Applying Designs in Relief and Brilliancy to all Kinds of Fabrics; and I do hereby declare that the following is a full, clear, and exact description thereof.

My invention consists in applying to silk, wool, felt, paper, cotton fabrics, and mixtures of the same, and even to fabrics no matter of what material they may be composed, by means of printing with all kinds of resinous materials, as, for example, resin, asphalt, benzone, yellow amber, succin, colophony, copal, dammara, dragon's blood, elemi, caoutchouc, gutta percha, gum, aloes, gum-lac, mastic, sandarac, olibanum, incense, turpentine, copaiba, liquid amber, China varnish, tar, or any materials producing similar results, and rendered soluble by means of their solvents, alcohol, or spirits of wine, ether, naphtha, acetum, chloroform, linseed oil, pink oil, or oil of walnut, essence of turpentine, pinic, essence of lavender, oil of aspic, essence of rosemary, camphor, American essence, coal, benzone, benzine, petroleum, or other liquids capable of being used as a vehicle. I obtain by means of these resinous substances, when in solution, a liquid which I color at will in every shade by means of the following coloring matters: soot, lamp-black, ivory-black, virgin-black, black called German-black, and the like, arnotto, sorrel, curcuma, saffron, fuchsine, violet, aniline blue, and the like.

By means of this liquid I can apply to all fabrics, by the printing processes already in use, designs or ornaments in relief having the brilliancy of the pearl and jet. I proceed in the following manner: First, I employ a resinous material, say copal, which, being prepared by a varnish-maker in the ordinary manner, the process needs no description here. Second, the solvents of this resinous material, say linseed oil and essence of turpentine. The linseed oil is rendered siccative according to the known processes by means of treating it with oxides of lead, of zinc, or of manganese. Third, the coloring material, which necessarily varies with each shade, carbonate or sulphate of lead or oxide of zinc for white, vermillion for red, carbonate of lead for the yellows, blue, ultramarine, scheile green, green cobalt, and other colors, according to those desired to be obtained; for black I prefer ivory-black. I take say six pounds of hard copal, which I melt with great care. When this resinous material is well melted I add to it say three pounds of linseed oil which has been previously heated to about 270° Fahrenheit; then I add to it from eight to ten pounds of essence of turpentine, which must be cold, and I stir and mix it carefully in order thoroughly to incorporate the parts. The above proportions vary with the different qualities of materials employed, and even according to the variations of the temperature at the time of the manufacture. The above proportions are only given as an example, and each operation requires great attention to obtain a good result.

The product before described being obtained, I filter it through a sieve made of wire gauze; then I allow it to cool and enclose it in a jar or other vessel, well stoppered. When the material is required to be used for printing, I take seventy-five parts of this varnish. I add to it twenty-five parts of ivory-black, the proportions, however, varying according to the different materials treated, fabrics, felt, or paper. The whole is well mixed, so that the parts are thoroughly incorporated, leaving no granular parts whatever. Then I filter it again through a sieve made of wire gauze, and it is ready for use. With this product I obtain a brilliant impression with or without relief, chiefly intended to imitate the pearl and jet. If I wish to give some relief to my impression I pour on a color-frame sufficient material to cover it, say to the depth of the sixteenth of an inch, or thereabouts, so that by taking the color from it I remove sufficient to produce an impression and at the same time a thickness. If, on the contrary, I only wish to make it brilliant, without caring for relief, I pour only a very small quantity of the material on the frame, so as to be only able to take from it that which is necessary to impress without giving relief. This material being thick and unctuous itself resumes an even surface on the frame after each stroke of the board, without the necessity of using a leveller, as in other kinds of printing.

What I claim as my invention, and desire to secure by Letters Patent, is—

The application or production of designs upon, and giving brilliancy to, fabrics by printing with resinous materials, substantially as herein specified.

In testimony whereof I have hereunto set my name in presence of two subscribing witnesses.

F. PETITDIDIER.

Witnesses:
    A. LE BLANC,
    J. BASSOULLET.